United States Patent [19]

Oka et al.

[11] 4,141,874

[45] Feb. 27, 1979

[54] FLUORINE-CONTAINING ELASTOMERIC COPOLYMERS, PROCESS FOR PREPARING THE SAME AND COMPOSITION CONTAINING THE SAME

[75] Inventors: Masahiko Oka, Takatsuki; Singo Tanigawa, Ibaraki; Takesi Suzuki, Nagaokakyo; Masayasu Tomoda, Takatsuki; Yutaka Ueta, Ibaraki, all of Japan

[73] Assignee: Daikin Kogyo Co., Ltd., Osaka, Japan

[21] Appl. No.: 740,772

[22] Filed: Nov. 10, 1976

[30] Foreign Application Priority Data

Nov. 15, 1975 [JP] Japan ................. 50-137668
Dec. 20, 1975 [JP] Japan ................. 50-152123
Jan. 1, 1976 [JP] Japan ................. 51-350

[51] Int. Cl.² .......................................... C08L 27/16
[52] U.S. Cl. ................... 260/29.6 F; 260/884; 260/900; 526/255
[58] Field of Search ............. 260/29.6 F, 884, 900; 526/255

[56] References Cited

U.S. PATENT DOCUMENTS

| | | | |
|---|---|---|---|
| 3,475,396 | 10/1969 | McCain et al. | 526/255 |
| 3,798,287 | 3/1974 | Murayama et al. | 260/900 |
| 3,845,024 | 10/1974 | Weaver | 260/900 |
| 3,857,807 | 12/1974 | Kometani et al. | 260/29.6 F |
| 3,857,827 | 12/1974 | Dohany | 260/29.6 F |
| 3,925,339 | 12/1975 | Ishii et al. | 526/255 |
| 3,929,934 | 12/1975 | Moore et al. | 260/900 |
| 3,951,913 | 4/1976 | Kometani et al. | 260/29.6 F |

*Primary Examiner*—Hosea E. Taylor
*Assistant Examiner*—Amelia B. Yarbrough
*Attorney, Agent, or Firm*—Armstrong, Nikaido, Marmelstein & Kubovcik

[57] ABSTRACT

Elastomeric copolymer of vinylidene fluoride and at least one other fluorine-containing monomer containing 28 to 92% by mole of the vinylidene fluoride unit and having an intrinsic viscosity of 0.4 to 1.3 at 35° C. in methyl ethyl ketone, which is prepared by a two-stage polymerization process of vinylidene fluoride monomer and at least one other fluorine-containing monomer wherein monomers are copolymerized in an aqueous medium in the presence of a water-soluble radical polymerization initiator at a first stage to give a first stage-copolymer having an intrinsic viscosity of 0.01 to 3.0 at 35° C. in methyl ethyl ketone and then copolymerized in an aqueous medium in the presence of the first stage-copolymer and an oil-soluble radical polymerization initiator at a second stage to give a second stage-copolymer, said elastomeric copolymer comprising 1 to 80% by weight of the first stage-copolymer and 20 to 99% by weight of the second stage-copolymer, process for preparing the same and composition containing the same. The elastomeric copolymer can be cured at satisfactory cure rate to give cured rubber having low compression set and high elongation.

22 Claims, No Drawings

4,141,874

FLUORINE-CONTAINING ELASTOMERIC COPOLYMERS, PROCESS FOR PREPARING THE SAME AND COMPOSITION CONTAINING THE SAME

BACKGROUND OF THE INVENTION

The present invention relates to a novel and useful elastomeric copolymer of vinylidene fluoride and at least one other fluorine-containing monomer, and more particularly to fluorine-containing copolymers comprising a a copolymer produced by copolymerizing the above monomers in the presence of a water-soluble radical initiator at a first stage and a copolymer produced by copolymerizing the above monomers in the presence of an oil-soluble radical initiator at a second stage, and to a process for preparing the same and a composition of the same.

Fluorine-containing elastomeric copolymers such as vinylidene fluoride-hexafluoropropene copolymer and vinylidene fluoride-hexafluoropropene-tetrafluoroethylene terpolymer have excellent heat stability, oil resistance, solvent resistance and chemical resistance, and have been widely employed as industrial materials.

Hitherto, fluorine-containing elastomeric copolymers are generally prepared by emulsion polymerization of monomers in an aqueous medium in the presence of a water-soluble radical polymerization initiator such as inorganic peroxide compound or a combination of an inorganic peroxide compound with a reducing agent, or by solution polymerization of monomers in an organic solvent in the presence of an oil-soluble polymerization initiator such as an oil-soluble peroxide compound. Also, there is proposed in U.S. Pat. No. 3,801,552 a process for preparing fluorine-containing elastomeric copolymers by suspension-polymerizing monomers in an aqueous medium containing an organic solvent in the presence of an oil-soluble radical initiator.

However, fluorine-containing elastomeric copolymers prepared by the emulsion polymerization using an inorganic radical initiator have the disadvantage that when it is cured by a curing system aiming at providing a cured rubber having a low compression set, for instance, by a curing system consisting of a curing agent of an aromatic polyhydroxy compound and an accelerator, the curing reactivity is generally poor. Therefore, when curing the copolymer by using a curing agent and accelerator in a small amount sufficient for giving cured rubbers having a desirable low compession set, the cure rate is slow. On the other hand, when curing the copolymer by using a curing agent and accelerator in a large amount required for curing it at satisfactory cure rate, the cured rubber has undesirable high compression set and also the elongation is lowered. Fluorine-containing elastomeric copolymers prepared by the suspension polymerization using an oil-soluble radical polymerization initiator overcome to some extent the defect of the elastomeric copolymers prepared by the emulsion polymerization, and can provide cured rubbers having a low compression set at a desirable cure rate. However, such a suspension polymerization process has the disadvantages on preparation steps that the conversion of monomers is low and the recovery of the employed organic solvent is required, and is not desirable in practical use.

OBJECTS OF THE INVENTION

It is an object of the present invention to provide a novel and useful fluorine-containing elastomeric copolymer of vinylidene fluoride and at least one other fluorine-containing monomer.

A further object of the invention is to provide fluorine-containing elastomeric copolymers which can be cured at a satisfactory cure rate to give cured products having low compression set.

A still further object of the invention is to provide fluorine-containing elastomeric copolymers having excellent heat stability and processing properties.

A more still further object of the invention is to provide a process for preparing fluorine-containing elastomeric copolymers.

Another object of the invention is to provide compositions of fluorine-containing elastomeric copolymers.

These and other objects will become apparent from the description hereinafter.

DETAILED DESCRIPTION

It has now been found that the above-mentioned objects can be accomplished by elastomeric copolymers of vinylidene fluoride and at least one other fluorine-containing monomer containing 28 to 92% by mole of the vinylidene fluoride unit and having an intrinsic viscosity of 0.4 to 1.3 at 35° C. in methyl ethyl ketone, which are prepared by a two-stage polymerization process of vinylidene fluoride monomer and at least one other fluorine-containing monomer, wherein monomers are first copolymerized in an aqueous medium in the presence of a water-soluble radical polymerization initiator to give a first stage-copolymer, and then copolymerized in an aqueous medium in the presence of the first stage-copolymer and an oil-soluble radical polymerization initiator to give a second stage-copolymer, said elastomeric copolymers comprising 1 to 80% by weight of the first stage-copolymer and 20 to 99% by weight of the second stage-copolymer.

The fluorine-containing elastomeric copolymer prepared by the two-stage polymerization process of the present invention has improved properties which overcome the disadvantage of fluorine-containing elastomeric copolymers prepared by the ordinary emulsion polymerization. Even if cured by using the before-mentioned curing system aiming at providing a cured product having low compression set, the elastomeric copolymer of the present invention exhibits excellent curing reactivity. Therefore, the elastomeric copolymer of the present invention can be cured at a satisfactory cure rate to give a cured rubber having desirable low compression set and high elongation. Also, the obtained cured product has a low modulus at 100% elongation and high elongation, and is like the so-called rubber. The elastomeric copolymer of the present invention has excellent heat stability and processing properties. For instance, in case of processing by roll, the elastomeric copolymer can be bound readily to roll and the surface smoothness of the compounded rubber sheet is favorable, and the flow property is good. Also, according to the process of the present invention, since the polymerization substantially proceeds in an aqueous medium in a manner of emulsion polymerization, the disadvantages on preparation steps as in the before-mentioned suspension polymerization are eliminated, and the conversion of monomers is high. The polymerization in both the first and second stages proceeds at a desirable polymerization rate at a relatively low temperature such as 30° to 80° C. Moreover, since the produced polymer particles in an aqueous emulsion have a large particle size, they can be easily coagulated by adding a small amount of a coagulating agent to the aqueous emulsion, and also the washing of the coagulated polymer is easy.

The fluorine-containing elastomeric copolymers of the present invention are prepared by a two-stage polymerization of vinylidene fluoride monomer and at least one other fluorine-containing monomer. At a first stage, monomers are polymerized in an aqueous medium by using a water-soluble radical polymerization initiator, and at a second stage, monomers are further polymerized in an aqueous emulsion of the copolymer obtained at the first stage by using an oil-soluble radical polymerization initiator. The first stage polymerization and the second stage polymerization may be continuously or discontinuously carried out. Also, the second stage polymerization may be carried out in a different polymerization vessel from that in the first stage polymerization. Further, the copolymer produced at the first stage may be once isolated in a conventional manner such as coagulation, and again emulsified in water to give an emulsion of the copolymer which is used in the second stage polymerization.

At the first stage, monomers are emulsion-polymerized to give a copolymer having an intrinsic viscosity of 0.01 to 3.0 at 35° C. in methyl ethyl ketone. In the present invention, since a water-soluble radical polymerization initiator such as ammonium persulfate is employed, the formed copolymer has hydrophilic groups which serve as a dispersion stabilizer and, therefore, is generally obtained in a form of a stable aqueous emulsion without using a dispersion stabilizer.

The second stage polymerization proceeds substantially in a manner like an emulsion polymerization in the presence of the copolymer obtained at the first stage as a seed. In general, when the polymerization of fluorine-containing monomers is carried out in an aqueous medium by employing an oil-soluble radical polymerization initiator such as diisopropyl peroxydicarbonate, the formed elastomeric copolymer has no hydrophilic group and lacks the dispersion stability, differing from the polymerization using a water-soluble radical initiator. Therefore, with the progress of the polymerization, the formed copolymer precipitates or adheres to stirrer blades and walls of a polymerization vessel to completely separate from the aqueous layer. As a result, the polymerization rate ramarkably decreases. Although it may be proposed to add the known dispersion stabilizer to eliminate the above problem, the above phenomenon is merely softened a little and the problem cannot be eliminated in substance.

The present inventors have found the new fact that the above problem can be eliminated by making exist the copolymer as a seed, which is obtained by using a water-soluble radical polymerization initiator. According to the present invention, a stable aqueous emulsion of a fluorine-containing copolymer can be obtained at an economical polymerization rate by polymerizing fluorine-containing monomers in the presence of the copolymer obtained at the first stage and an oil-soluble radical polymerization initiator without the substantial use of a dispersion stabilizer.

The feature of the fluorine-containing elastomeric copolymer of the present invention is that the fluorine-containing elastomeric copolymer comprises 1 to 80% by weight, preferably 2 to 40% by weight, of the component of the first stage-copolymer having an intrinsic viscosity of 0.01 to 3.0, preferably 0.3 to 2.0 at 35° C. in methyl ethyl ketone and 20 to 99% by weight, preferably 60 to 98% by weight, of the component of the second stage-copolymer, and has an intrinsic viscosity of 0.4 to 1.3, preferably 0.5 to 1.1. Especially, it is important for the present invention that the first stage-copolymer component produced by the polymerization using a water-soluble radical polymerization initiator ranges from 1 to 80% by weight and the second stage-copolymer component produced by the polymerization using an oil-soluble radical polymerization initiator ranges from 20 to 99% by weight. When the component ratio of the final product is out of the above range, for instance, when the first stage-copolymer component is more than 80% by weight, the curing reactivity and compression set are hard to be improved, and also when the second stage-copolymer component is more than 99% by weight, the polymerization does not proceed since the dispersion stability of the formed copolymer is impaired during the polymerization and the formed copolymer precipitates, and also there is a tendency for the obtained copolymer to be poor in the roll processing property such as lowering of the binding property to roll and the surface smoothness of compounded rubber sheet. When the second stage-copolymer is within the range of 20 to 99% by weight, preferably 90 to 98% by weight, the polymerization smoothly proceeds without the occurrence of the precipitation of the formed copolymer and also the obtained copolymer shows excellent curing reactivity and compression set. Further, the intrinsic viscosity of the first stage-copolymer is not within the range of 0.01 to 3.0, the desired copolymer is not obtained even if the final product has an intrinsic viscosity of 0.4 to 1.3. For instance, when the intrinsic viscosity of the first stage-copolymer is less than 0.01, the curing reactivity and compression set are not favorable. When the intrinsic viscosity is more than 3.0, the processing property is lowered. It is also necessary for maintaining the dispersion stability of the copolymer produced at the second stage polymerization that the intrinsic viscosity of the first stage-copolymer is within the range of 0.01 to 3.0. Furthermore, when the intrinsic viscosity of the final product is not within the range of 0.4 to 1.3, properties required in elastomeric copolymer cannot be obtained.

The fluorine-containing elastomeric copolymer of the present invention produced by the two-stage polymerization is different in the uniformity and other properties from a mixture obtained merely by mechanically blending copolymers which are independently prepared in an aqueous medium, respectively in the presence of a water-soluble radical initiator and in the presence of an oil-soluble radical initiator. For instance, the copolymer of the present invention exhibits excellent curing reactivity and compression set and has a desirable roll processing property, as compared with the mechanical blend. It is presumed from the results of the present inventors' research that at the second stage polymerization monomers and an oil-soluble radical initiator permeate into the particles of the first stage-copolymer dispersed in the polymerization system and then the monomers polymerize mainly inside the particles or on the surfaces of the particles. This presumption is supported by the facts that the number of the polymer particles scarcely varies during the second stage polymerization and only the volume of the polymer particles increases and further the polymerization rate of the second stage polymerization is proportional to the number of the polymer particles in the polymerization system. Judging from the good dispersibility of the polymer particles in the second stage polymerization, it is reasonable to consider that the polymerization of the second stage takes place mostly inside the polymer particles, not on the surfaces of the polymer particles to cover the surfaces, and the produced polymer particles are still covered by the hydrophilic groups derived from the water-soluble radical initiator used in the first stage polymerization, which groups serve as a surface active agent for the particles and, therefore, the good dispersibility of the polymer particles is maintained during the second stage polymerization. Therefore, it may be considered that the fluorine-containing elastomeric copolymer of the present invention is composed of a copolymer formed by bonding the second stage-copolymer to the first stage-copolymer with some chemical bond such as grafting.

In the present invention, vinylidene fluoride and at least one other fluorine-containing monomer are copolymerized. Examples of the fluorine-containing monomer copolymerizable with vinylidene fluoride employed in the present invention are tetrafluoroethylene, trifluoroethylene, trifluorochloroethylene, trifluoropropene, hexafluoropropene, pentafluoropropene, trifluorobutene, and perfluoroalkyl perfluorovinyl ethers such as perfluoromethyl perfluorovinyl ether and perfluoroethyl perfluorovinyl ether. As the other fluorine-containing monomers, hexafluoropropene and tetrafluoroethylene are suitably employed in the present invention. For instance, binary copolymers of 28 to 92% by mole of vinylidene fluoride and 8 to 72% by mole of hexafluoropropene and ternary copolymers of 28 to 86% by mole of vinylidene fluoride, 9 to 42% by mole of hexafluoropropene and 5 to 30% by mole of tetrafluoroethylene show the most excellent properties among the fluorine-containing elastomeric copolymers of the present invention.

The other monomer copolymerizable with vinylidene fluoride employed in the second stage polymerization is usually the same as that employed in the first stage polymerization. However, in compliance with the purpose, the other monomer copolymerizable with vinylidene fluoride employed in the second stage polymerization may be different from that of the first stage polymerization to give a copolymer having various interesting characteristics. Also, the ratio of monomers in the second stage polymerization may be the same as or different from that in the first stage polymerization.

In the first stage polymerization, the known water-soluble peroxide compounds are usually employed as water-soluble radical polymerization initiators. Examples of the water-soluble peroxide compound are ammonium, sodium and potassium persulfates, perborates, perchlorates, perphosphates and percarbonates, disuccinyl peroxide, t-butyl permaleate, and t-butyl hydroperoxide. These peroxide compounds may be employed in combination with a reducing agent such as ammonium, sodium or potassium sulfite, bisulfite, metabisulfite, hyposulfite, thiosulfite, phosphite or hypophosphite, or metal salts which can be easily oxidized. However, the peroxide compound is preferably employed alone since elastomeric copolymers having excellent compression set are generally obtained as compared with the case using the peroxide compound with a reducing agent.

As the oil-soluble radical polymerization initiator employed in the second stage polymerization, the known oil-soluble peroxide compounds are usually employed. Examples of the oil-soluble peroxide compound are dialkyl peroxydicarbonates such as diisopropyl peroxydicarbonate and di-s-butyl peroxydicarbonate, peroxyesters such as t-butyl peroxyisobutylate and t-butyl peroxypivalate, and dialkyl peroxides such as di-t-butyl peroxide. Diisopropyl peroxydicarbonate is preferred.

Although the amounts of the water-soluble and oil-soluble radical polymerization initiators vary depending on the polymerization conditions, especailly polymerization temperature, the water-soluble radical initiator is usually employed in an amount of 0.01 to 20% by weight, preferably 0.05 to 10% by weight, based on the total weight of the monomers employed in the first stage polymerization, and also the oil-soluble radical initiator is usually employed in an amount of 0.05 to 5% by weight, preferably 0.1 to 2% by weight, based on the total weight of the monomers employed in the second stage polymerization.

The first stage polymerization is carried out in accordance with a conventional emulsion polymerization. For instance, when it is desired to prepare vinylidene fluoride-hexafluoropropene elastomeric copolymer of the molar ratio of vinylidene fluoride to hexafluoropropene being 78:22, a pressure resisting autoclave is charged with water and a monomer mixture for initial charging consisting of 53% by mole of vinylidene fluoride and 47% by mole of hexafluoropropene. The monomer mixture is supplied to the autoclave until the pressure reaches the prescribed pressure. Then, the temperature is elevated with agitation, and when the temperature becomes constant, an aqueous solution of a water-soluble radical initiator is supplied to the autoclave to initiate the polymerization. The polymerization is carried out with agitation. During the polymerization, a monomer mixture for continuous charging having the same composition, which corresponds to that of the formed copolymer, as that of the monomers consumed with the progress of the polymerization is successively added to maintain the prescribed polymerization pressure. After the completion of the polymerization, unreacted monomers is removed to give an aqueous emulsion of the desired fluorine-containing elastomeric copolymer. The thus obtained emulsion may be treated by the known method, for instance, the emulsion may be treated with an active carbon to decompose the undecomposed water-soluble radical initiator remaining in the emulsion.

The second stage polymerization is carried out usually by employing the aqueous emulsion obtained in the first stage. Although the aqueous emulsion obtained in the first stage may be treated so as to decompose the water-soluble radical initiator remaining in the emulsion, the amount of the undecomposed initiator remaining in the emulsion is usually small and in such a case there is no necessity of treating the emulsion to decompose the remaining initiator. A pressure resisting autoclave is charged with the aqueous emulsion obtained at the first stage, and the polymerization is carried out by employing an oil-soluble radical initiator in the same manner as in the first stage polymerization.

In both the first and second stage polymerizations, the polymerization temperature is usually from 30° to 110° C., preferably 40° to 80° C., and the polymerization pressure is usually not less than 5 kg./cm.$^2$.G, preferably not less than 10 kg./cm.$^2$G. However, by these conditions, processes for preparing fluorine-containing elastomeric copolymers of the present invention are not limited at all. Of course, at the first and second stage polymerizations, the temperature and pressure conditions may be the same or different.

Although the two-stage polymerization process according to the present invention does not require the use of a dispersion stabilizer in substance, it may be employed in the invention. Examples of the dispersion stabilizer employed in the present invention are fluorocarboxylic acids such as perfluorooctanoic acid, perfluorononanoic acid, perfluorodecanoic acid, ω-hydroperfluorononanoic acid and ω-hydroperfluoroundecanoic acid, and water-soluble salts thereof. The dispersion stabilizer is employed usually in an amount of 0.01 to 1% by weight based on the weight of water in the polymerization system. Also, as occasion demands, known chain transfer agent may be employed to control the molecular weight.

The fluorine-containing elastomeric copolymer of the present invention can be easily cured by a conventional curing procedure, for instance, by means of a peroxide or radiation, or by means of a curing agent system consisting of an acid acceptor and a polyamine such as hexamethylene diamine carbamate, N,N'-dicinnamylidene-1,6-hexamethylenediamine or 4,4'-diaminodicyclohexyl methane carbamate, or a curing agent system consisting of an acid acceptor, a curing agent such as aromatic polyhydroxy compounds or dithiol compounds and an accelerator such as quaternary ammonium compounds, quaternary phosphonium compounds, substituted guanidine compounds and their salts, substituted amidine compounds and their salts or other basic compounds.

When a curing agent system aiming at giving a cured product having excellent compression set, namely a curing agent system consisting of an acid acceptor, an aromatic polyhydroxy compound as a curing agent and an accelerator as mentioned above is employed, the fluorine-containing elastomeric copolymer of the present invention can be easily cured at a good cure rate to give cured rubber having low compression set and high elongation. Examples of the acid acceptor are bivalent metal oxides such as magnesium oxide, calcium oxide, lead oxide or zinc oxide, bivalent metal hydroxides such as magnesium hydroxide, calcium hydroxide, lead hydroxide or zinc hydroxide, and mixtures of the above metal oxides and/or metal hydroxides with metal salts of weak acids such as barium, potassium, lead or calcium stearate, benzoate, carbonate, oxalate or phosphite. Examples of the aromatic polyhydroxy compound are 2,2-bis(4-hydroxyphenyl)propane [Bisphenol A], 2,2-bis(4-hydroxyphenyl)perfluoropropane [Bisphenol AF], resorcinol, 1,3,5-trihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 4,4'-dihydroxydiphenyl ether, 4,4'-dihydroxydiphenyl methane, 2,2-bis(4-hydroxyphenyl)butane [Bisphenol B], 4,4-bis-(4-hydroxyphenyl)pentanoic acid, 2,2-bis(4-hydroxyphenyl)tetrafluorodichloropropane, 4,4'-dihydroxydiphenyl sulfone, 4,4'-dihydroxydiphenyl ketone, tri(4-hydroxyphenyl)methane, 3,3',5,5'-tetrachlorobisphenol A and 3,3',5,5'-tetrabromobisphenol A. Alkali or alkaline earth metal salts of the above aromatic polyhydroxy compounds may also be employed. Preferable aromatic polyhydroxy compounds are hydroquinone, Bisphenol A, Bisphenol AF, 4,4'-dihydroxydiphenyl ether, 4,4'-dihydroxydiphenyl methane and Bisphenol B.

As the above-mentioned accelerators, quaternary ammonium compounds having the following general formula:

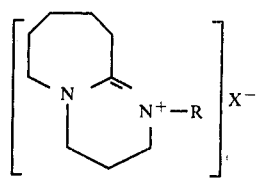

wherein R is an alkyl group having 1 to 24 carbon atoms or an aralkyl group having 7 to 20 carbon atoms, and $X^-$ is an anion such as a halide ion, hydroxylate ion, alkoxylate ion, carboxylate ion, phenoxide ion, sulfonate ion, sulfate ion, sulfite ion and carbonate ion, are preferably employed. Examples of the quaternary ammonium compound are 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0]-7-undecenium methylsulfate, 8-ethyl-1,8-diaza-bicyclo[5.4.0]-7-undecenium bromide, 8-propyl-1,8-diaza-bicyclo[5.4.0]-7-undecenium bromide, 8-dodecyl-1,8-diaza-bicyclo[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenethyl-1,8-diaza-bicyclo[5.4.0]-7-undecenium chloride, 8-(3-phenylpropyl)-1,8-diaza-bicyclo[5.4.0]-7-undecenium chloride, and the like.

Thus the fluorine-containing elastomeric copolymer of the present invention may be compounded with 2 to 30 parts by weight, preferably 5 to 20 parts by weight of the acid acceptor, 0.5 to 5 parts by weight, preferably 0.5 to 2 parts by weight of the aromatic polyhydroxy compound and 0.2 to 10 parts by weight, preferably 0.2 to 3 parts by weight of the quaternary ammonium compound, respectively per 100 parts by weight of the elastomeric copolymer, to give a fluoroelastomer composition. When the amount of the quaternary ammonium compound as an accelerator is less than the above range, there is a tendency for the elastomeric copolymer to be insufficiently cured or for the properties desired in a cured elastomer to be impaired. If desired, fillers and reinforcing agents such as a carbon black, silica, clay, diatomaceous earth and talc may also be employed. Also, one or more known other curing agents may be employed in a small quantity. Further, if desired, plasticizers and colorants may also be employed.

The thus obtained fluoroelastomer composition can be cured in a conventional manner. For instance, after milling the composition by mixing rolls, the composition is put into a mold and cured under pressure. The resulting article is taken out from the mold, and then cured in an oven. In general, the press cure is carried out at a temperature 100° to 200° C. under a pressure of 20 to 100 kg./cm.$^2$G for a period of 10 to 180 minutes, and the oven cure is carried out at a temperature of 150° to 300° C. for a period of 0 to 30 hours. Other processes for cure, for instance, a process wherein the cure is carried out after pre-molding such as injection molding or extrusion, or a process wherein a coating composition prepared by dissolving or dispersing the fluoroelastomer composition in at least one solvent selected from ketones such as methyl ethyl ketone, acetone and cyclohexanone, and ethers such as methyl ethyl ether, diethyl ether, dioxane and tetrahydrofuran is applied onto the surface of a paper, fiber, film, sheet, board, tube, pipe, tank, big vessel or other shaped articles made by cellulose derivatives, synthetic resin, metal or the others and then cured, may also be applicable.

The present invention is more specifically described and explained by means of the following Examples wherein all parts are by weight except as otherwise noted.

EXAMPLE 1

[Polymerization at the First Stage]

A 36.6 liter polymerization vessel was charged with 15 liters of demineralized and deoxidized water. Air within the vessel was thoroughly replaced with pure nitrogen gas, and then 690 g. of a monomer mixture consisting of 65% by mole of vinylidene fluoride and 35% by mole of hexafluoropropene was supplied to the vessel. After elevating the temperature to 80° C. with agitation, 26.3 g. of ammonium persulfate dissolved in 100 ml. of demineralized and deoxidized water was supplied to the vessel by nitrogen pressure to initiate the polymerization. At the same time, an aqueous solution of ammonium persulfate having a concentration of 207 g./liter was supplied to the vessel in a rate of 1 ml./min. which corresponded to the amount of the decomposed ammonium persulfate to maintain the concentration of ammonium persulfate constant.

During the polymerization, a monomer mixture consisting of 78% by mole of vinylidene fluoride and 22% by mole of hexafluoropropene was successively supplied to the vessel so as to maintain the polymerization pressure at 8 kg./cm.$^2$G, since the pressure dropped with the progress of the polymerization. After 164 minutes from the initiation of the polymerization, heating and agitation were stopped and the monomers remaining in the polymerization system were removed to terminate the polymerization.

The polymer content of the aqueous emulsion was 21.0% by weight. The intrinsic viscosity [$\eta$] of the first stage-copolymer was 0.90 (at 35° C. in methyl ethyl ketone).

[Polymerization at the Second Stage]

The aqueous emulsion obtained by the first stage polymerization was treated with an active carbon to decompose ammonium persulfate remaining in the emulsion.

A 36.6 liter polymerization vessel was charged with 3 liters of the above treated emulsion and 12 liters of demineralized and deoxidized water. After thoroughly replacing air within the vessel with pure nitrogen gas, 1,200 g. of a monomer mixture consisting of 65% by mole of vinylidene fluoride and 35% by mole of hexafluoropropene was supplied to the vessel. Then, the temperature was elevated to 70° C. with agitation and 15 g. of diisopropyl peroxydicarbonate was supplied to the vessel by nitrogen pressure to initiate the polymerization.

During the polymerization, a monomer mixture consisting of 78% by mole of vinylidene fluoride and 22% by mole of hexafluoropropene was successively supplied to the vessel so as to maintain the polymerization pressure at 14 kg./cm.$^2$G, since the pressure dropped with the progress of the polymerization. After 185 minutes from the initiation of the polymerization, heating and agitation were stopped and the monomers remaining in the polymerization system were removed to terminate the polymerization.

The polymer content of the resulting aqueous emulsion was 21.0% by weight. The intrinsic viscosity [$\eta$] of the finally obtained copolymer was 0.89 (at 35° C. in methyl ethyl ketone).

EXAMPLES 2 to 7

The first stage polymerization of Example 1 was repeated.

Employing the thus obtained emulsion, the second stage polymerization of Example 1 was repeated except that the polymerization conditions shown in Table 1 were applied.

The results are shown in Table 1.

EXAMPLE 8

[Polymerization at the First Stage]

A 36.6 liter polymerization vessel was charged with 15 liters of demineralized and deoxidized water. Air within the vessel was thoroughly replaced with pure nitrogen gas, and then 900 g. of a monomer mixture consisting of 46.5% by mole of vinylidene fluoride, 37.0% by mole of hexafluoropropene and 16.5% by mole of tetrafluoroethylene was supplied to the vessel. After elevating the temperature to 100° C. with agitation, an aqueous solution of 69 g. of ammonium persulfate in 360 ml. of demineralized and deoxidized water was supplied to the vessel in a rate of 1.0 ml./min.

During the polymerization, a monomer mixture consisting of 63.5% by mole of vinylidene fluoride, 18.0% by mole of hexafluoropropene and 18.5% by mole of tetrafluoroethylene was successively supplied to the vessel so as to maintain the polymerization pressure at 10 kg./cm.$^2$G, since the pressure dropped with the progress of the polymerization. After 130 minutes from the initiation of the polymerization, heating and agitation were stopped and the monomers remaining in the polymerization system were removed to terminate the polymerization.

The polymer content of the aqueous emulsion was 25.2% by weight. The intrinsic viscosity [$\eta$] of the first stage-copolymer was 0.89 (at 35° C. in methyl ethyl ketone).

[Polymerization at the Second Stage]

The aqueous emulsion obtained by the first stage polymerization was treated with an active carbon to decompose ammonium persulfate remaining in the emulsion.

A 3 liter polymerization vessel was charged with 0.2 liter of the above treated emulsion and 0.8 liter of demineralized and deoxidized water. After thoroughly replacing air within the vessel with pure nitrogen gas, 120 g. of a monomer mixture consisting of 46.5% by mole of vinylidene fluoride, 37.0% by mole of hexafluoropropene and 16.5% by mole of tetrafluoroethylene was supplied to the vessel. Then, the temperature was elevated to 70° C. with agitation and 3.0 g. of diisopropyl peroxydicarbonate was supplied to the vessel by nitrogen pressure to initiate the polymerization.

During the polymerization, a monomer mixture consisting of 63.5% by mole of vinylidene fluoride, 18.0% by mole of hexafluoropropene and 18.5% by mole of tetrafluoroethylene was successively supplied to the vessel so as to maintain the polymerization pressure at 14 kg./cm.$^2$G, since the pressure dropped with the progress of the polymerization. After 60 minutes from the initiation of the polymerization, heating and agitation were stopped and the monomers remaining in the polymerization system were removed to terminate the polymerization.

The polymer content of the resulting aqueous emulsion was 22.0% by weight. The intrinsic viscosity [$\eta$] of the finally obtained copolymer was 0.95 (at 35° C. in methyl ethyl ketone).

Comparative Example 1

The first stage polymerization of Example 1 was repeated to give the same first stage aqueous emulsion as in Example 1.

Comparative Example 2

A 36.6 liter polymerization vessel was charged with 15 liters of demineralized and deoxidized water and 75 g. of ammonium $\omega$-hydroperfluorononanoate. After thoroughly replacing air within the vessel with pure nitrogen gas, 1,580 g. of a monomer mixture consisting of 65% by mole of vinylidene fluoride and 35% by mole of hexafluoropropene was supplied to the vessel. Then, the temperature was elevated to 70° C. with agitation and 45 g. of diisopropyl peroxydicarbonate was supplied to the vessel by nitrogen pressure to initiate the polymerization.

During the polymerization, a monomer mixture consisting of 78% by mole of vinylidene fluoride and 22% by mole of hexafluoropropene was successively supplied to the vessel so as to maintain the polymerization pressure at 17 kg./cm.$^2$G, since the pressure dropped with the progress of the polymerization. After 140 minutes from the initiation of the polymerization, heating and agitation were stopped and the monomers remaining in the polymerization system were removed to terminate the polymerization.

The polymer content of the aqueous emulsion was 7.3% by weight. The intrinsic viscosity [$\eta$] of the resulting copolymer was 0.73 (at 35° C. in methyl ethyl ketone).

The yield of the copolymer was low and also it was observed that a large amount of the produced copolymer adhered to the walls of the vessel and the stirrer blades.

Comparative Example 3

The first stage polymerization of Example 8 was repeated to give the same first stage aqueous emulsion as in Example 8.

Comparative Example 4

A 36.6 liter polymerization vessel was charged with 15 liters of demineralized and deoxidized water and 4.5 g. of methylcellulose (viscosity: 50 cps.). After thoroughly replacing air within the vessel with pure nitrogen gas, 4.5 liters of 1,1,2-trichloro-1,2,2,-trifluoroethane was supplied to the vessel under a reduced pressure. Then, a monomer mixture consisting of 34.5% by mole of vinylidene fluoride, 58% by mole of hexafluoropropene and 7.5% by mole of tetrafluoroethylene was supplied to the vessel until the pressure became 10 kg./cm.$^2$G at 40° C., and was kept at a temperature of 40° C. with agitation. Further, 60 g. of diisopropyl peroxydicarbonate dissolved in 100 ml. of 1,1,2-trichloro-1,2,2-trifuluoroethane was supplied to the vessel by nitrogen pressure to initiate the polymerization.

Another 20 liter sealed vessel was charged with a monomer mixture consisting of 64% by mole of vinylidene fluoride, 18% by mole of hexafluoropropene and 18% by mole of tetrafluoroethylene and was connected to the above polymerization vessel. During the polymerization, this monomer mixture was supplied to the polymerization vessel so as to maintain the pressure constant. After 289 minutes from the initiation of the polymerization, heating and agitation were stopped and the monomers remaining in the polymerization system were removed to terminate the polymerization.

The amount of the thus produced copolymer was 3,860 g. and the intrinsic viscosity [$\eta$] of the copolymer was 1.10 (at 35° C. in methyl ethyl ketone).

Comparative Example 5

The copolymer obtained in Comparative Example 1 and the copolymer obtained in Comparative Example 2 were uniformly blended by rolls in a weight ratio of 95 : 5 to give a blended copolymer.

Comparative Example 6

The terpolymer obtained in Comparative Example 3 and the terpolymer obtained in Comparative Example 4 were uniformly blended by rolls in a weight ratio of 95 : 5 to give a blended terpolymer.

Table 1

| | Polymerization conditions | | | | | | Copolymer | | |
|---|---|---|---|---|---|---|---|---|---|
| | Pressure kg./cm$^2$G | Temperature ° C. | Amount of first stage copolymer g. | Amount of water for polymerization liter | Amount of catalyst g. | Polymerization time minute | Amount of the produced copolymer g. | Intrinsic viscosity — | Polymer composition (VdF/HFP or VdF/HFP/TFE) % by mole |
| Ex. 1 | 14 | 10 | 695 | 15 | 15 | 185 | 3,900 | 0.89 | 78/22 |
| Ex. 2 | 14 | 40 | 46.4 | 0.8 | 3 | 170 | 116 | 0.73 | 78/22 |
| Ex. 3 | 14 | 80 | 46.4 | 0.8 | 3 | 110 | 211 | 0.49 | 78/22 |
| Ex. 4 | 14 | 70 | 11.6 | 0.95 | 3 | 163 | 204 | 0.48 | 78/22 |
| Ex. 5 | 20 | 70 | 46.4 | 0.8 | 3 | 39 | 304 | 0.59 | 78/22 |
| Ex. 6 | 14 | 70 | 46.4 | 0.8 | 1 | 137 | 237 | 0.96 | 78/22 |
| Ex. 7 | 14 | 70 | 11.6 | 0.95 | 2 | 197 | 215 | 0.78 | 78/22 |
| Ex. 8 | 14 | 70 | 56.4 | 0.8 | 3 | 60 | 280 | 0.95 | 63.5/18.0/18.5 |
| Com. Ex. 1 | 8 | 80 | — | 15 | 60.2 | 164 | 3,980 | 0.90 | 78/22 |
| Com. Ex. 2 | 17 | 70 | — | 15 | 45 | 140 | 1,100 | 0.73 | 78/22 |
| Com. Ex. 3 | 10 | 100 | — | 15 | 23.3 | 130 | 5,070 | 0.89 | 63.5/18.0/18.5 |

Table 1-continued

| | Polymerization conditions | | | | | Copolymer | | |
|---|---|---|---|---|---|---|---|---|
| | Pressure kg./cm²G | Temperature °C. | Amount of first stage copolymer g. | Amount of water for polymerization liter | Amount of catalyst g. | Polymerization time minute | Amount of the produced copolymer g. | Intrinsic viscosity — | Polymer composition (VdF/HFP or VdF/HFP/TFE) % by mole |
| Ex. 4 | 10 | 40 | — | 15 | 60 | 289 | 3,860 | 1.10 | 63.5/18.0/18.5 |

(Note 1) The polymerization conditions of Examples 1 to 8 shown in Table 1 are conditions of the second stage polymerization.
(Note 2) Catalyst employed in Examples 1 to 8 is diisopropyl peroxydicarbonate.
(Note 3) In Table 1, VdF, HFP and TFE mean vinylidene fluoride, hexafluoropropene and tetrafluoro-ethylene, respectively.

[Curing Test]

Employing the copolymers obtained in Examples 1 to 8 and Comparative Examples 1 to 6, fluoroelastomer compositions were prepared by adding the curing agent, accelerator and other additives which were shown in Table 2 to the copolymer on rubber rolls cooled by water and then milling them. The thus prepared fluoroelastomer compositions were allowed to stand over night.

After milling again, a compounded composition was cut to a desired shape and put into a mold. Then, the composition was cured at a temperature shown in Table 2 for a period of 20 minutes to give a sheet having a thickness of about 2 mm. or a block having a thickness of about 13 mm. The press-cured composition was taken out from the mold and then subjected to an oven cure at a temperature shown in Table 2 for a period of 24 hours.

It was observed that in case of the compositions using the copolymers obtained in Examples 1 to 8, the elastomeric copolymer can be readily bound to roll, the surfaces of the compounded sheet was smooth and the flow property was desirable.

Employing the thus obtained cured products in a form of sheet or block, modulus at 100% elongation, tensile strength, elongation, hardness and compression set were measured. Also, curing test of the compositions was carried out by using a Curelasto Meter (JSR-Curelasto Meter No. II Type). From the obtained curing curve, minimum viscosity, extent of cure, induction time, proper curing time and cure rate were measured.

1. Modulus at 100% elongation, tensile strength and elongation are measured with dumbbell test pieces (No. 3) prepared from the sheet by using a universal tensile tester (UTM-III type) made by Toyo Sokki Kabushiki Kaisha according to the provision of Japanese Industrial Standard K 6301 which corresponds to ASTM D 412-68.

2. Hardness is measured by using a hardness tester (Asker J type) made by Kobunshi Keiki Kabushiki Kaisha.

3. Compression set is measured the test disk samples prepared from the block, according to the provision of JIS K 6301, as follows: The test samples are kept at 200° C. under a compression of 25% for 24 hours, and then allowed to stand at a room temperature for 30 minutes for measurement with a thickness gauge for rubber of Peacock type made by Kabushiki Kaisha Ozaki Seisakusho. Compression set is calculated on the basis of a thickness of sample according to the following equation:

$$\text{Compression set (\%)} = (t_0 - t_1)/(t_0 - t_2) \times 100$$

wherein $t_0$ is thickness (mm.) before compression, $t_1$ is thickness (mm.) after compression and $t_2$ is thickness (mm.) of spacer.

4. Curing test is carried out by using No. 1 of mold chamber (34 mm. × 7 mm. × 2 mm.). The test sample is put into the mold chamber and tested under the conditions of temperature of 170° C., frequency of 6 c./min. and amplitude of 3°. A curing curve is prepared from the stresses measured with the elapse of time, and therefrom minimum viscosity, extent of cure, induction time, proper curing time and cure rate are obtained.

The results are shown in Table 2.

Table 2

| Run No. | 1 | 2 | 3 | 4 | 5 | 6 | 7 |
|---|---|---|---|---|---|---|---|
| Copolymer employed | Ex. 1 | Ex. 1 | Ex. 1 | Ex. 1 | Ex. 1 | Ex. 1 | Ex. 1 |
| Fluoroelastomer composition (part) | | | | | | | |
| Copolymer | 100 | 100 | 100 | 100 | 100 | 100 | 100 |
| Medium thermal carbon | 20 | 20 | 20 | 20 | 20 | 20 | 20 |
| Magnesium oxide (high activity) | 3 | 3 | 3 | 3 | 3 | — | — |
| Magnesium oxide (low activity) | — | — | — | — | — | 15 | 15 |
| Calcium hydroxide | 6 | 6 | 8 | 7 | 8 | — | — |
| Hydroquinone | — | — | — | — | — | — | — |
| Bisphenol AF | 2 | — | — | — | — | — | — |
| Bisphenol A | — | 1.6 | 1.6 | — | — | — | — |
| 4,4'-Dihydroxydiphenyl ether | — | — | — | 1.6 | — | — | — |
| 4,4'-Dihydroxydiphenyl methane | — | — | — | — | 1.6 | — | — |
| Hexamethylene diamine carbamate | — | — | — | — | — | 1.5 | — |
| N,N'-dicinnamylidene-1,6-hexamethylenediamine | — | — | — | — | — | — | 3.0 |
| 8-Benzyl-1,8-diaza-bicyclo[5.4.0]-7-undecenonium chloride | 0.30 | 0.35 | 0.30 | 0.35 | 0.35 | — | — |
| Curing test | | | | | | | |
| Minimum viscosity (kg.) | 0.41 | 0.40 | 0.41 | 0.41 | 0.39 | 0.63 | — |
| Extent of cure (kg.) | 3.67 | 3.51 | 3.67 | 3.47 | 3.66 | 3.45 | — |
| Induction time (min.) | 3.1 | 3.3 | 3.6 | 3.0 | 3.9 | 1.5 | — |
| Proper curing time (min.) | 4.8 | 5.5 | 6.3 | 5.3 | 7.2 | 15.8 | — |
| Cure rate (min.) | 1.7 | 2.2 | 2.7 | 2.3 | 3.4 | 14.3 | — |
| Curing temperature — Press cure (° C.) | 170 | 170 | 170 | 170 | 170 | 150 | 160 |
| Oven cure (° C.) | 230 | 230 | 230 | 230 | 230 | 200 | 200 |
| Properties of cured product | | | | | | | |
| Modulus at 100% elongation (kg./cm.²) | 43 | 52 | 55 | 44 | 48 | 44 | 31 |
| Tensile strength (kg./cm.²) | 146 | 146 | 139 | 126 | 137 | 157 | 136 |
| Elongation (%) | 220 | 210 | 210 | 200 | 190 | 220 | 260 |
| Hardness | 73 | 74 | 74 | 73 | 75 | 74 | 74 |
| Compression set (%) | 7 | 9 | 8 | 8 | 8 | 36 | 47 |

Table 2-continued

| Run No. | 8 | 9 | 10 | 11 | 12 | 13 | 14 |
|---|---|---|---|---|---|---|---|
| Copolymer employed | Ex. 2 | Ex. 3 | Ex. 4 | Ex. 5 | Ex. 6 | Ex. 7 | Ex. 8 |
| Fluoroelastomer composition (part) | | | | | | | |
| Copolymer | 100 | 100 | 100 | 100 | 100 | 100 | 100 |
| Medium thermal carbon | 20 | 20 | 20 | 20 | 20 | 20 | 20 |
| Magnesium oxide (high activity) | 3 | 3 | 3 | 3 | 3 | 3 | 3 |
| Magnesium oxide (low activity) | — | — | — | — | — | — | — |
| Calcium hydroxide | 6 | 6 | 6 | 6 | 6 | 6 | 6 |
| Hydroquinone | — | — | — | — | — | — | — |
| Bisphenol AF | 2 | 2 | 2 | 2 | 2 | 2 | 2 |
| Bisphenol A | — | — | — | — | — | — | — |
| 4,4'-Dihydroxydiphenyl ether | — | — | — | — | — | — | — |
| 4,4'-Dihydroxydiphenyl methane | — | — | — | — | — | — | — |
| Hexamethylene diamine carbamate | — | — | — | — | — | — | — |
| N,N'-dicinnamylidene-1,6-hexamethylenediamine | — | — | — | — | — | — | — |
| 8-Benzyl-1,8-diaza-bicyclo[5.4.0]-7-undecenonium chloride | 0.30 | 0.30 | 0.30 | 0.30 | 0.30 | 0.30 | 0.35 |
| Curing test | | | | | | | |
| Minimum viscosity (kg.) | 0.29 | 0.07 | 0.07 | 0.16 | 0.56 | 0.35 | 0.52 |
| Extent of cure (kg.) | 3.52 | 1.34 | 1.83 | 3.00 | 3.99 | 3.90 | 3.41 |
| Induction time (min.) | 4.2 | 5.0 | 4.5 | 4.7 | 3.7 | 4.0 | 4.0 |
| Proper curing time (min.) | 6.1 | 7.3 | 6.2 | 6.6 | 5.6 | 5.6 | 6.8 |
| Cure rate (min.) | 1.9 | 2.3 | 1.7 | 1.9 | 1.9 | 1.6 | 2.8 |
| Curing temperature — Press cure (° C.) | 170 | 170 | 170 | 170 | 170 | 170 | 180 |
| Oven cure (° C.) | 230 | 230 | 230 | 230 | 230 | 230 | 230 |
| Properties of cured product | | | | | | | |
| Modulus at 100% elongation (kg./cm.$^2$) | 55 | 34 | 39 | 43 | 49 | 51 | 58 |
| Tensile strength (kg./cm.$^2$) | 150 | 117 | 110 | 133 | 130 | 144 | 151 |
| Elongation (%) | 210 | 240 | 230 | 220 | 210 | 220 | 230 |
| Hardness | 74 | 73 | 74 | 73 | 74 | 75 | 75 |
| Compression set (%) | 8 | 10 | 10 | 9 | 7 | 7 | 10 |

| Run No. | 15 | 16 | 17 | 18 | 19 |
|---|---|---|---|---|---|
| Copolymer employed | Com. Ex. 1 | Com. Ex. 1 | Com. Ex. 1 | Com. Ex. 1 | Com. Ex. 2 |
| Fluoroelastomer composition (part) | | | | | |
| Copolymer | 100 | 100 | 100 | 100 | 100 |
| Medium thermal carbon | 20 | 20 | 20 | 20 | 20 |
| Magnesium oxide (high activity) | 3 | 3 | — | — | 3 |
| Magnesium oxide (low activity) | — | — | 15 | 15 | — |
| Calcium hydroxide | 6 | 6 | — | — | 6 |
| Hydroquinone | — | — | — | — | — |
| Bisphenol AF | 2 | — | — | — | 2 |
| Bisphenol A | — | — | — | — | — |
| 4,4'-Dihydroxydiphenyl ether | — | 1.60 | — | — | — |
| 4,4'-Dihydroxydiphenyl methane | — | — | — | — | — |
| Hexamethylene diamine carbamate | — | — | 1.5 | — | — |
| N,N'-dicinnamylidene-1,6-hexamethylenediamine | — | — | — | 3.0 | — |
| 8-Benzyl-1,8-diaza-bicyclo[5.4.0]-7-undecenonium chloride | 0.35 | 0.40 | — | — | 0.30 |
| Curing test | | | | | |
| Minimum viscosity (kg.) | 0.38 | 0.35 | 0.51 | — | 0.33 |
| Extent of cure (kg.) | 3.96 | 3.77 | 3.19 | — | 3.62 |
| Induction time (min.) | 4.3 | 7.5 | 2.0 | — | 3.3 |
| Proper curing time (min.) | 9.2 | 13.0 | 18.0 | — | 6.8 |
| Cure rate (min.) | 4.9 | 5.5 | 16.0 | — | 3.5 |
| Curing temperature — Press cure (° C.) | 170 | 170 | 150 | 160 | 170 |
| Oven cure (° C.) | 230 | 230 | 200 | 200 | 230 |
| Properties of cured product | | | | | |
| Modulus at 100% elongation (kg./cm.$^2$) | 58 | 55 | 52 | 40 | 56 |
| Tensile strength (kg./cm.$^2$) | 150 | 158 | 170 | 161 | 152 |
| Elongation (%) | 190 | 190 | 220 | 260 | 200 |
| Hardness | 75 | 74 | 75 | 76 | 74 |
| Compression set (%) | 11 | 11 | 36 | 43 | 9 |

| Run No. | 20 | 21 | 22 | 23 |
|---|---|---|---|---|
| Copolymer employed | Com. Ex. 3 | Com. Ex. 4 | Com. Ex. 5 | Com. Ex. 6 |
| Fluoroelastomer composition (part) | | | | |
| Copolymer | 100 | 100 | 100 | 100 |
| Medium thermal carbon | 20 | 20 | 20 | 20 |
| Magnesium oxide (high activity) | 3 | 3 | 3 | 3 |
| Magnesium oxide (low activity) | — | — | — | — |
| Calcium hydroxide | 6 | 6 | 6 | 6 |
| Hydroquinone | 1.2 | 1.2 | — | 1.2 |
| Bisphenol AF | — | — | 2 | — |
| Bisphenol A | — | — | — | — |
| 4,4'-Dihydroxydiphenyl ether | — | — | — | — |
| 4,4'-Dihydroxydiphenyl methane | — | — | — | — |
| Hexamethylene diamine carbamate | — | — | — | — |
| N,N'-dicinnamylidene-1,6-hexamethylenediamine | — | — | — | — |
| 8-Benzyl-1,8-diaza-bicyclo[5.4.0]-7-undecenonium chloride | 0.55 | 0.55 | 0.30 | 0.55 |
| Curing test | | | | |
| Minimum viscosity (kg.) | 0.49 | 0.27 | 0.23 | 0.36 |
| Extent of cure (kg.) | 3.94 | 4.97 | 3.58 | 4.90 |
| Induction time (min.) | 4.7 | 3.1 | 3.2 | 3.2 |
| Proper curing time (min.) | 9.2 | 6.8 | 6.9 | 6.9 |
| Cure rate (min.) | 4.5 | 3.7 | 3.7 | 3.7 |
| Curing temperature — Press cure (° C.) | 180 | 180 | 170 | 180 |
| Oven cure (° C.) | 230 | 230 | 230 | 230 |
| Properties of cured product | | | | |
| Modulus at 100% elongation (kg/cm.$^2$) | 62 | 87 | 56 | 86 |
| Tensile strength (kg./cm.$^2$) | 182 | 132 | 150 | 137 |
| Elongation (%) | 220 | 140 | 190 | 150 |
| Hardness | 70 | 72 | 75 | 71 |

Table 2-continued

| Compression set (%) | 12 | 13 | 10 | 13 |
| --- | --- | --- | --- | --- |

From the results shown in Table 2, it will be understood that the fluorine-containing elastomeric copolymers of the present invention are superior to those prepared by using ammonium persulfate or diisopropyl peroxydicarbonate as a catalyst and mixtures thereof in point of curing reactivity of copolymer and properties of cured product, especially elongation and compression set.

What we claim is:

1. An elastomeric copolymer of vinylidene fluoride and at least one other fluorine-containing monomer, said copolymer containing 28 to 92% by mole of the vinylidene fluoride unit and having an intrinsic viscosity of 0.4 to 1.3 at 35° C. in methyl ethyl ketone, said other fluorine-containing monomer being at least one member selected from the group consisting of tetrafluoroethylene, trifluoroethylene, trifluorochloroethylene, trifluoropropene, hexafluoropropene, pentafluoropropene, trifluorobutene, perfluoromethyl perfluorovinyl ether and perfluoroethyl perfluorovinyl ether, which copolymer is prepared by copolymerizing at a first stage vinylidene fluoride and at least one other fluorine-containing monomer in an aqueous medium in the presence of a water-soluble radical polymerization initiator to give a first stage-copolymer having an intrinsic viscosity of 0.01 to 3.0 at 35° C. in methyl ethyl ketone, and further copolymerizing at a second stage vinylidene fluoride and at least one other fluorine-containing monomer in an aqueous medium in the presence of said first stage-copolymer and an oil-soluble radical polymerization initiator to give a second stage-copolymer, said elastomeric copolymer comprising 1 to 80% by weight of said first stage-copolymer and 20 to 99% by weight of said second stage copolymer.

2. The elastomeric copolymer of claim 1, comprising 2 to 40% by weight of said first stage-copolymer and 60 to 98% by weight of said second stage-copolymer.

3. The elastomeric copolymer of claim 1, wherein said intrinsic viscosity of the elastomeric copolymer falls within the range of 0.5 to 1.1 at 35° C. in methyl ethyl ketone.

4. In a process for preparing an elastomeric copolymer by copolymerizing vinylidene fluoride and at least one other fluorine-containing monomer, the improvement which comprises the steps of
   (a) copolymerizing at a first stage vinylidene fluoride and at least one other fluorine-containing monomer in an aqueous medium in the presence of a water-soluble radical polymerization initiator to give a first stage-copolymer having an intrinsic viscosity of 0.01 to 3.0 at 35° C. in methyl ethyl ketone and containing 28 to 92% by mole of the vinylidene fluoride unit, and
   (b) copolymerizing at a second stage vinylidene fluoride and at least one other fluorine-containing monomer in an aqueous medium in the presence of said first stage-copolymer and an oil-soluble radical polymerization initiator to give a second stage-copolymer containing 28 to 92% by mole of the vinylidene fluoride unit, said elastomeric copolymer comprising 1 to 80% by weight of said first stage-copolymer and 20 to 99% by weight of said second stage-copolymer and having an intrinsic viscosity of 0.4 to 1.3 at 35° C. in methyl ethyl ketone.

5. The process of claim 4, wherein said first stage-copolymer has an intrinsic viscosity of 0.3 to 2.0 at 35° C. in methyl ethyl ketone.

6. The process of claim 4, wherein said other fluorine-containing monomer is at least one member selected from the group consisting of tetrafluoroethylene, trifluoroethylene, trifluorochloroethylene, trifluoropropene, hexafluoropropene, pentafluoropropene, trifluorobutene, perfluoromethyl perfluorovinyl ether and perfluoroethyl perfluorovinyl ether.

7. The process of claim 4, wherein said other fluorine-containing monomer of the step (b) is different from that employed in the step (a).

8. The process of claim 4, wherein said water-soluble radical polymerization initiator is a peroxide.

9. The process of claim 8, wherein said peroxide is at least one member selected from the group consisting of ammonium, sodium and potassium persulfates, perborates, perchlorates, perphosphates and percarbonates, disuccinyl peroxide, t-butyl permaleate and t-butyl hydroperoxide.

10. The process of claim 8, wherein said peroxide is employed in combination with at least one reducing agent selected from the group consisting of ammonium, sodium and potassium sulfites, bisulfites, metabisulfites, hyposulfites, thiosulfites, phosphites and hypophosphites, and metal salts which can be easily oxidized.

11. The process of claim 4, wherein said oil-soluble radical polymerization initiator is a peroxide.

12. The process of claim 11, wherein said peroxide is at least one member selected from the group consisting of dialkyl peroxydicarbonates, peroxyesters and dialkyl peroxides.

13. The process of claim 12, wherein said dialkyl peroxydicarbonate is a member selected from the group consisting of diisopropyl peroxydicarbonate and di-s-butyl peroxydicarbonate.

14. In a fluoroelastomer composition comprising (a) fluoroelastomer, (b) an acid acceptor selected from the group consisting of magnesium oxide, calcium oxide, lead oxide, zinc oxide, magnesium hydroxide, calcium hydroxide, lead hydroxide, zinc hydroxide, and mixtures of the above metal oxides and/or metal hydroxides with metal salts of weak acids of barium, potassium, and lead, calcium stearate, benzoate, carbonate, oxalate and phosphite, (c) an aromatic polyhydroxide containing compound selected from the group consisting of 2,2-bis(4-hydroxyphenyl)propane [Bisphenol A], 2,2-bis(4-hydroxyphenyl)perfluoropropane [Bisphenol AF], resorcinol, 1,3,5-trihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 4,4'-dihydroxydiphenyl ether, 4,4'-dihydroxydiphenyl methane, 2,2-bis(4-hydroxyphenyl)butane [Bisphenol B], 4,4-bis(4-hydroxyphenyl)pentanoic acid, 2,2-bis(4-hydroxyphenyl)tetrafluorodichloropropane, 4,4'-dihydroxydiphenyl sulfone, 4,4'-dihydroxydiphenyl ketone, tri(4-hydroxyphenyl)methane, 3,3',5,5'-tetrachlorobisphenol A and 3,3',5,5'-tetrabromobisphenol A and alkali or alkaline earth metal salts of these aromatic polyhydroxy compounds, and (d) a quaternary ammonium compound having the following general formula:

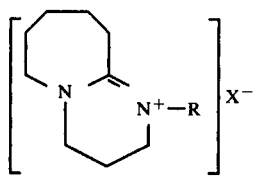

wherein R is an alkyl group having from 1 to 24 carbon atoms or an aralkyl group having from 7 to 20 carbon atoms, and $X^-$ is an anion selected from the group consisting of a halide ion, hydroxylate ion, alkoxylate ion, carboxylate ion, phenoxide ion, sulfonate ion, sulfate ion, sulfite ion and carbonate ion, the improvement which comprises employing as said fluoroelastomer an elastomeric copolymer of vinylidene fluoride and at least one other fluorine-containing monomer containing 28 to 92% by mole of the vinylidene fluoride unit and having an intrinsic viscosity of 0.4 to 1.3 at 35° C. in methyl ethyl ketone, said other fluorine-containing monomer being at least one member selected from the group consisting of tetrafluoroethylene, trifluoroethylene, trifluorochloroethylene, trifluoropropene, hexafluoropropene, pentafluoropropene, trifluorobutene, perfluoromethyl perfluorovinyl ether and perfluoroethyl perfluorovinyl ether, which copolymer is prepared by copolymerizing at a first stage vinylidene fluoride and at least one other fluorine-containing monomer in an aqueous medium in the presence of a water-soluble radical polymerization initiator to give a first stage-copolymer having an intrinsic viscosity of 0.01 to 3.0 at 35° C. in methyl ethyl ketone and further copolymerizing at a second stage vinylidene fluoride and at least one other fluorine-containing monomer in an aqueous medium in the presence of said first stage-copolymer and an oil-soluble radical polymerization initiator to give a second stage-copolymer, said elastomeric copolymer comprising 1 to 80% by weight of said first stage-copolymer and 20 to 99% by weight of said second stage-copolymer.

15. The composition of claim 14, wherein said quaternary ammonium compound is present in an amount of 0.2 to 10 parts by weight per 100 parts by weight of the fluoroelastomer.

16. The composition of claim 14, wherein said quaternary ammonium compound is present in an amount of 0.2 to 3 parts by weight per 100 parts by weight of the fluoroelastomer.

17. The composition of claim 14, wherein said quaternary ammonium compound is a member selected from the group consisting of 8-methyl-1,8-diaza-bicyclo[5.4.0]-7-undecenonium chloride, 8-methyl-1,8-diaza-bicyclo[5.4.0]-7-undecenonium iodide, 8-methyl-1,8-diaza-bicyclo[5.4.0]-7-undecenonium hydroxide, 8-methyl-1,8-diaza-bicyclo[5.4.0]-7-undecenonium methylsulfate, 8-ethyl-1,8-diaza-bicyclo[5.4.0]-7-undecenonium bromide, 8-propyl-1,8-diaza-bicyclo[5.4.0]-7-undecenonium bromide, 8-dodecyl-1,8-diaza-bicyclo[5.4.0]-7-undecenonium chloride, 8-dodecyl-1,8-diaza-bicyclo[5.4.0]-7-undecenonium hydroxide, 8-eicosyl-1,8-diaza-bicyclo[5.4.0]-7-undecenonium chloride, 8-tetracosyl-1,8-diaza-bicyclo[5.4.0]-7-undecenonium chloride, 8-benzyl-1,8-diaza-bicyclo[5.4.0]7-undecenonium chloride, 8-benzyl-1,8-diaza-bicyclo[5.4.0]-7-undecenonium hydroxide, 8-phenethyl-1,8-diaza-bicyclo[5.4.0]-7-undecenonium chloride and 8-(3-phenylpropyl)-1,8-diaza-bicyclo[5.4.0]-7-undecenonium chloride.

18. The composition of claim 14, wherein said acid acceptor is present in an amount of 2 to 30 parts by weight per 100 parts by weight of the fluoroelastomer.

19. The composition of claim 14, wherein said acid acceptor is present in an amount of 5 to 20 parts by weight per 100 parts by weight of the fluoroelastomer.

20. The composition of claim 14, wherein said aromatic polyhydroxy compound is present in an amount of 0.5 to 5 parts by weight per 100 parts by weight of the fluoroelastomer.

21. The composition of claim 14, wherein said aromatic polyhydroxy compound is present in an amount of 0.5 to 2 parts by weight per 100 parts by weight of the fluoroelastomer.

22. The composition of claim 14, wherein said aromatic polyhydroxy compound is a member selected from the group consisting of hydroquinone, 2,2-bis(4-hydroxyphenyl)propane, 2,2-bis(4-hydroxyphenyl)perfluoropropane, 4,4'-dihydroxydiphenyl ether, 4,4'-dihydroxydiphenyl methane and 2,2'-bis(4-hydroxyphenyl)butane.

* * * * *